United States Patent
Burchardt et al.

(10) Patent No.: US 11,371,483 B2
(45) Date of Patent: Jun. 28, 2022

(54) METHOD OF MANUFACTURING A SHELL OF A WIND TURBINE BLADE HAVING IMPROVED LEADING EDGE EROSION PROTECTION, METHOD FOR MANUFACTURING THE WIND TURBINE BLADE, SHELL, WIND TURBINE BLADE AND WIND TURBINE

(71) Applicant: Siemens Gamesa Renewable Energy A/S, Brande (DK)

(72) Inventors: Claus Burchardt, Gistrup (DK); Jesper Monrad Laursen, Silkeborg (DK); Mogens Nielsen, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/083,656

(22) Filed: Oct. 29, 2020

(65) Prior Publication Data
US 2021/0148328 A1    May 20, 2021

(30) Foreign Application Priority Data
Nov. 15, 2019   (EP) .................................... 19209528

(51) Int. Cl.
*F03D 1/06* (2006.01)
*B29C 70/48* (2006.01)
(Continued)

(52) U.S. Cl.
CPC ............ *F03D 1/0675* (2013.01); *B29C 70/48* (2013.01); *B29K 2075/00* (2013.01);
(Continued)

(58) Field of Classification Search
CPC ......... F03D 1/0675; F03D 1/06; B29C 70/48; B29K 2075/00; F05B 2230/21; F05B 2240/30
See application file for complete search history.

(56) References Cited

U.S. PATENT DOCUMENTS 8,961,142 B2 * 2/2015 Wansink ............... F03D 1/0675
416/224
10,473,086 B2 * 11/2019 Yarbrough .............. F03D 80/50
(Continued)

FOREIGN PATENT DOCUMENTS

CN     102448711 A    5/2012
EP     2927482 A1    10/2015
(Continued)

OTHER PUBLICATIONS

European Search Report and Written Opinion of the European Searching Authority dated May 19, 2020 for Application No. 19209528.9.

*Primary Examiner* — Juan G Flores
*Assistant Examiner* — Joshua R Beebe
(74) *Attorney, Agent, or Firm* — Schmeiser, Olsen & Watts LLP

(57) ABSTRACT

Provided is a method for manufacturing a shell of a wind turbine blade having improved leading edge erosion protection, wherein the method includes the steps of: (a) providing a preform of the shell, (b) providing a protective cover for protection of the shell, (c) arranging the protective cover at a portion of a leading edge of the shell, so that an erosion protected shell is obtained, and (d) casting the erosion protected shell, so that the shell of the wind turbine blade having the improved erosion protection is obtained. Also provided is a method of manufacturing the wind turbine blade and to a shell, a wind turbine blade and a wind turbine.

14 Claims, 4 Drawing Sheets

(51) Int. Cl.
*B29K 75/00* (2006.01)
*B29K 83/00* (2006.01)

(52) U.S. Cl.
CPC ..... *B29K 2083/005* (2013.01); *F05B 2230/21* (2013.01); *F05B 2240/30* (2013.01)

(56) References Cited

U.S. PATENT DOCUMENTS

| | | | |
|---|---|---|---|
| 11,092,133 B2* | 8/2021 | Drachmann Haag | B32B 5/02 |
| 2010/0008788 A1 | 1/2010 | Barbee et al. | |
| 2010/0278654 A1* | 11/2010 | Kyriakides | F03D 80/30 |
| | | | 416/226 |
| 2011/0142678 A1 | 6/2011 | Santiago et al. | |
| 2012/0034094 A1* | 2/2012 | Wansink | B29D 99/0025 |
| | | | 416/230 |
| 2012/0257984 A1* | 10/2012 | Frederiksen | B29C 70/541 |
| | | | 416/232 |
| 2013/0045105 A1* | 2/2013 | Driver | F03D 1/0675 |
| | | | 416/224 |
| 2013/0101426 A1 | 4/2013 | Saitou et al. | |
| 2013/0189113 A1* | 7/2013 | Madsen | F01D 5/14 |
| | | | 416/226 |
| 2015/0132140 A1* | 5/2015 | Haag | F03D 1/0675 |
| | | | 416/224 |
| 2015/0167633 A1* | 6/2015 | Tobin | F03D 1/0675 |
| | | | 416/229 R |
| 2016/0215757 A1* | 7/2016 | Behmer | B29C 70/0035 |
| 2017/0058863 A1* | 3/2017 | Yarbrough | F03D 80/50 |
| 2017/0314532 A1* | 11/2017 | Kirkegaard | C08G 18/7671 |
| 2018/0209400 A1* | 7/2018 | Drachmann Haag | B32B 27/08 |
| 2018/0304605 A1* | 10/2018 | Kuhn | B32B 27/12 |
| 2020/0056596 A1* | 2/2020 | Christiansen | B29C 70/48 |
| 2020/0166015 A1* | 5/2020 | Johansen | F03D 1/0633 |
| 2021/0062784 A1* | 3/2021 | Tangager | F03D 13/10 |

FOREIGN PATENT DOCUMENTS

| | | |
|---|---|---|
| WO | WO 2013092211 A1 | 6/2013 |
| WO | WO 2018206158 A1 | 11/2018 |
| WO | WO 2019048014 A1 | 3/2019 |

* cited by examiner

METHOD OF MANUFACTURING A SHELL OF A WIND TURBINE BLADE HAVING IMPROVED LEADING EDGE EROSION PROTECTION, METHOD FOR MANUFACTURING THE WIND TURBINE BLADE, SHELL, WIND TURBINE BLADE AND WIND TURBINE

CROSS-REFERENCE TO RELATED APPLICATIONS

This application claims priority to European Application No. 19209528.9, having a filing date of Nov. 15, 2019, the entire contents of which are hereby incorporated by reference.

FIELD OF TECHNOLOGY

The following relates to a method of manufacturing a shell of a wind turbine blade having improved leading edge erosion protection, a method for manufacturing the wind turbine blade, a shell, a wind turbine blade and a wind turbine.

BACKGROUND

In the operation of wind turbines, portions of the leading edges of the wind turbine blades of the wind turbines are eroded by water drops impacting on the leading edge. The severity and speed of progression of leading edge erosion depends on the impact occurrence and the impact force. The impact occurrence depends on the annual rainfall in the installation location of the wind turbine. The impact force is proportional to the size of the rain drops and the impact speed of the rain drops. The durability of the leading edge depends mainly on the erosion resistance of the wind turbine blade surface and its adhesion strength.

Figure 2:
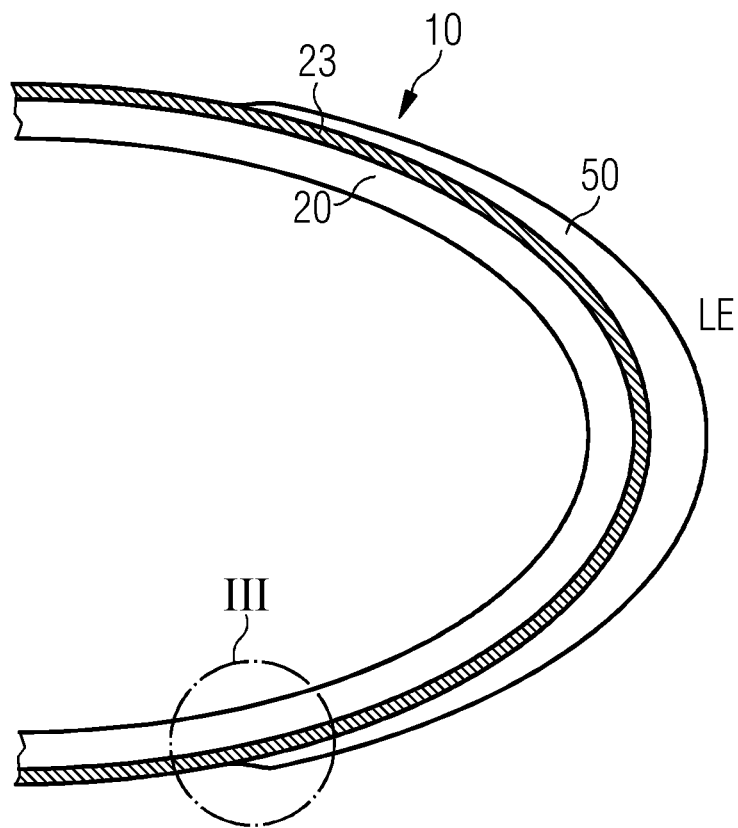
Figure 3:
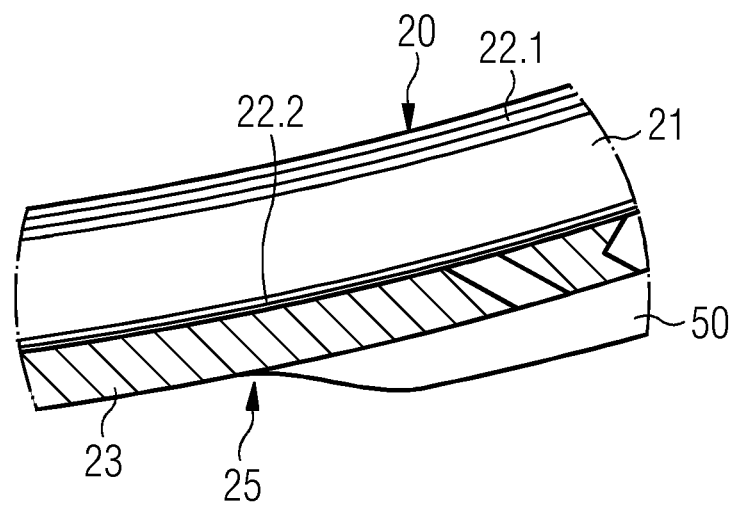

To prolong the durability of the leading edge of the wind turbine blade it is known to provide the shell of the wind turbine blade with a protective cover. The protective cover is attached to an outer surface of the painted shell by an adhesive. Such configuration as known from the state of the art is shown in FIGS. 2 and 3 and will be explained later in detail. It is challenging to provide a flush transition between the protective cover and the painted outer surface or paint coating of the shell. It is also challenging and expensive to smoothen the transition once the protective cover is adhered to the outer surface of the painted shell. When the transition comprises a step, the air flow at the location of transition may be turbulent instead of laminar. This may lead to a loss of blade efficiency and thereby reduction of annual energy production.

SUMMARY

An aspect relates to a method for manufacturing a shell of a wind turbine blade having improved leading edge erosion protection and such a shell, which does not have the potential disadvantages associated with the solution known from the state of the art, in particular, to provide a shell which is easy and inexpensive to manufacture yet providing high blade efficiency.

According to a first aspect of embodiments of the invention, the aspect is solved by a method for manufacturing a shell of a wind turbine blade having improved leading edge erosion protection, wherein the method comprises the steps of: (a) providing a preform of the shell, (b) providing a protective cover for protection of the shell, (c) arranging the protective cover at a portion of a leading edge of the shell, so that an erosion protected shell is obtained, and (d) casting the erosion protected shell, so that the shell for the wind turbine blade having the improved erosion protection is obtained.

The protective cover may be casted together with the shell such that the transition of the outer surface of the shell to the protective cover is flush, whereby turbulent flow at the location of transition is prevented. Integration of the protective cover in the casting process of the shell is an easy and inexpensive measure by which the leading edge erosion protection can be provided without the potential disadvantages known from the state of the art.

The protective cover may be provided as one single piece or as multiple pieces, e.g. having a length of approximately 1 meter, and arranged at the leading edge along the length of the shell to simplify the manufacturing process.

Casting in the sense of embodiments of the invention may be a process involving pouring or injecting a liquid material, in particular adhesive, into the cavity of a mold on which the preform is provided. After a certain time, the liquid material will cure via chemical reaction or cooling. Additionally, the liquid material may be heated to facilitate the reaction or cooling. The casted shell or wind turbine blade may be ejected or broken out of the mold.

It is advantageous that the preform comprises a core material and layers of laminate. As core material, wood, balsa, PET foam and/or PVC foam may be used, for example. The layers of laminate may be arranged as stacks of layers of fibrous composite materials. Such layers may be oriented with principal material directions in various geometric directions to satisfy loading and/or thermal requirements of the laminate. Thus, such a compo site laminate is an assembly of layers of fibrous composite materials joined together to provide required engineering properties, including in-plane stiffness, bending stiffness, strength, and coefficient of thermal expansion. Fibers of the layers may be embedded in a polymeric, metallic, or ceramic matrix material. As fibers, cellulose, glass, carbon, aramid, natural, boron, and/or silicon carbide fibers may be used, for example. For example, epoxies, polyimides, aluminum, titanium, and/or alumina may be used for the matrix material. The layers of laminate may be placed on a top side and a bottom side of the core material.

It is advantageous that the protective cover comprises or consists of a material different from the core material and the layers of laminate. Thereby, the properties of the protective cover may be chosen according to the requirements for erosion protection rather than structural requirements as is the case with the core material and layers of laminate, for example, because the protective cover is not intended to provide structural support.

It is advantageous that the protective cover comprises or consists of a material being relatively softer than the preform. Thereby, the protective cover can withstand the impact of rain drops better and thus will be less damaged over the course of operation of the wind turbine.

In particular it is advantageous that the protective cover comprises or consists of a silicone and/or a rubber, in particular comprising or from polyurethane. These materials are comparatively soft and have therefore shown to be particularly eligible as protective covers for the erosion protection.

Also, it is advantageous that the protective cover is a precasted protective cover. The protective cover being precasted before it is arranged at the leading edge portion of the shell allows for a high size accuracy at the leading edge of the shell. The protective cover being precasted also means that it is shaped in a predetermined form.

Further, it is advantageous that the protective cover is arranged in a recess of the preform of the shell. The recess may have a U-shape, V-shape, a wedge-like shape or similar, for example. The recess having a wedge-like shape may be arranged with its thick end at or close to the leading edge and tapered towards the trailing edge, such that there is provided a flush transition from the protective cover to the preform. By arranging the protective cover in a predetermined recess, in particular by interlocking the protective cover in the predetermined recess, the size accuracy can be kept high and provision of the shell with a paint coating is simplified.

Thereby, it is advantageous that the preform of the shell is provided on a mold, whereby the mold comprises an insert for providing the recess in the preform of the shell. Thus, when the preform is buildup on the mold, the recess is automatically provided in the preform, which is a particularly easy and inexpensive way of providing it. The insert may have a U-shape, V-shape, wedge-like shape or similar, for example.

Further, it is advantageous that a paint coating is applied on portions of the shell being adjacent to the protective cover such that a flush transition from the paint coating to the protective cover is obtained. The paint coating may be sprayed, for example. The protective cover may substantially be provided with a color matching the paint coating such that it is not necessary to provide the portion of the shell having the protective cover with the paint coating. It is particularly advantageous to not provide the protective cover with the paint coating, because the paint coating will typically be more susceptible to erosion than the protective cover.

It is also advantageous that the casting is performed by vacuum assisted resin transfer molding. This is a particularly easy and inexpensive method of manufacturing the very large shell of wind turbine blades.

According to a second aspect of embodiments of the invention, the aspect is solved by a method for manufacturing a wind turbine blade comprising the method according to the first aspect of embodiments of the invention, wherein a spar cap and a spar web are attached to the shell. The spar cap and spar web may be casted together with the erosion protected shell or separately.

According to a third aspect of embodiments of the invention, the aspect is solved by a shell for a wind turbine blade, whereby the shell has improved leading edge erosion protection and comprises a core material and layers of laminate, whereby a protective cover for protection of the shell is arranged at a portion of a leading edge of the shell and is provided as being casted together with the core material and the layers of laminate.

According to a fourth aspect of embodiments of the invention, the aspect is solved by a wind turbine blade comprising a shell according to the third aspect of embodiments of the invention, whereby a spar cap and a spar web are attached to the shell.

According to a fifth aspect of embodiments of the invention, the aspect is solved by turbine comprising at least one wind turbine blade according to the fourth aspect of embodiments of the invention.

BRIEF DESCRIPTION

Figure 1:
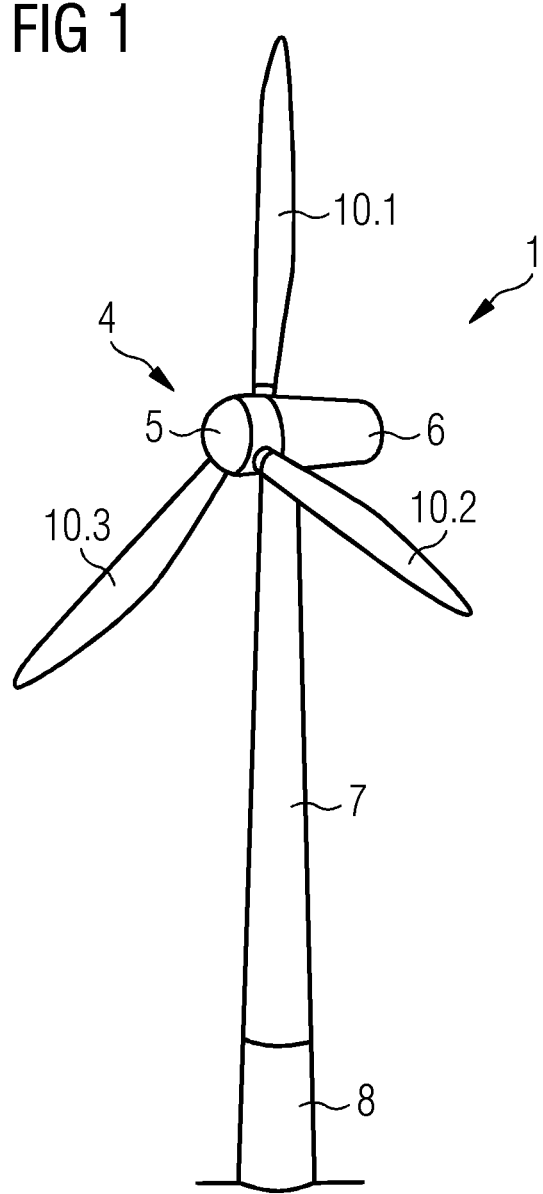
Figure 4:
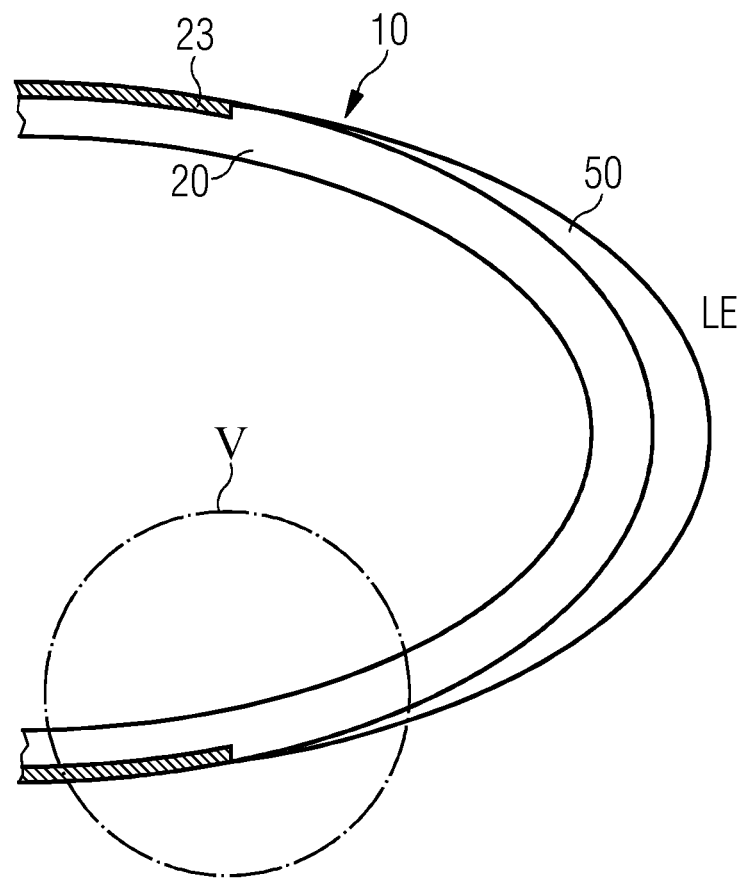
Figure 5:
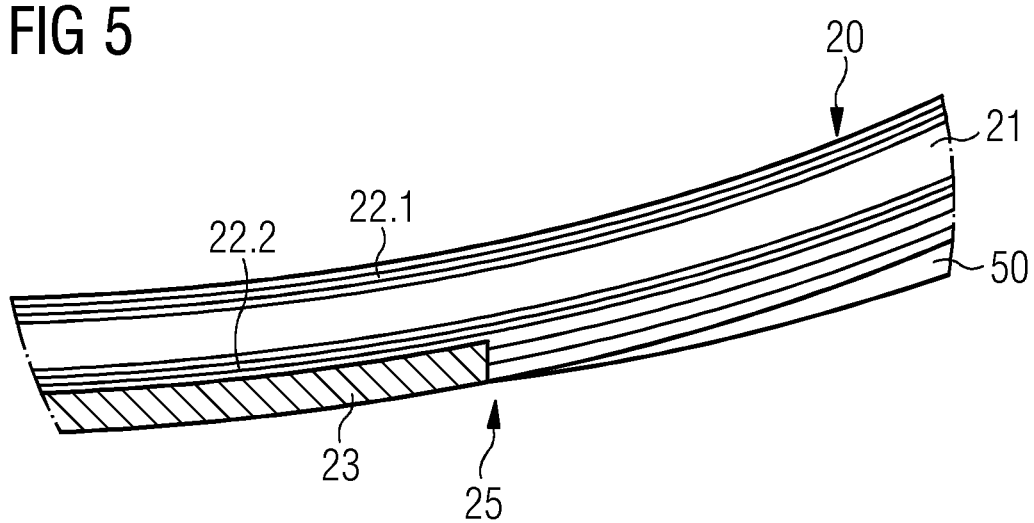
Figure 6:
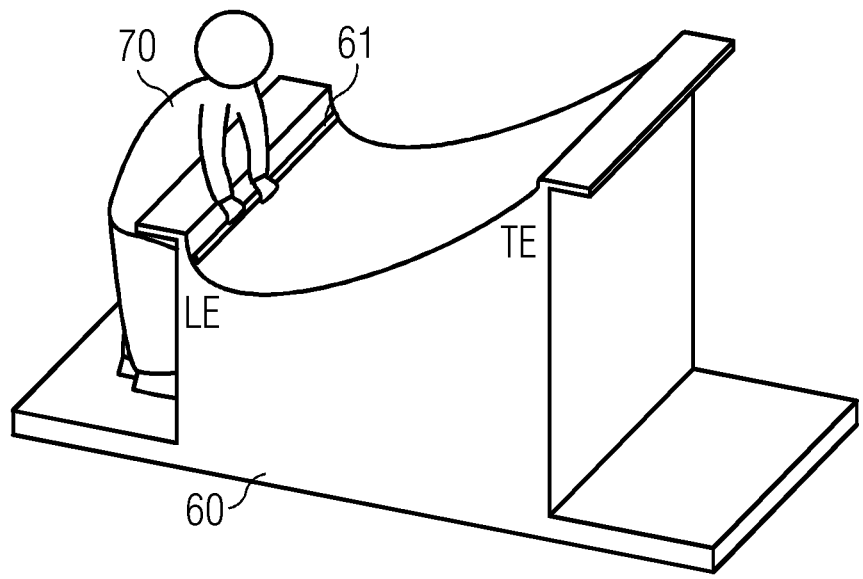
Figure 7:
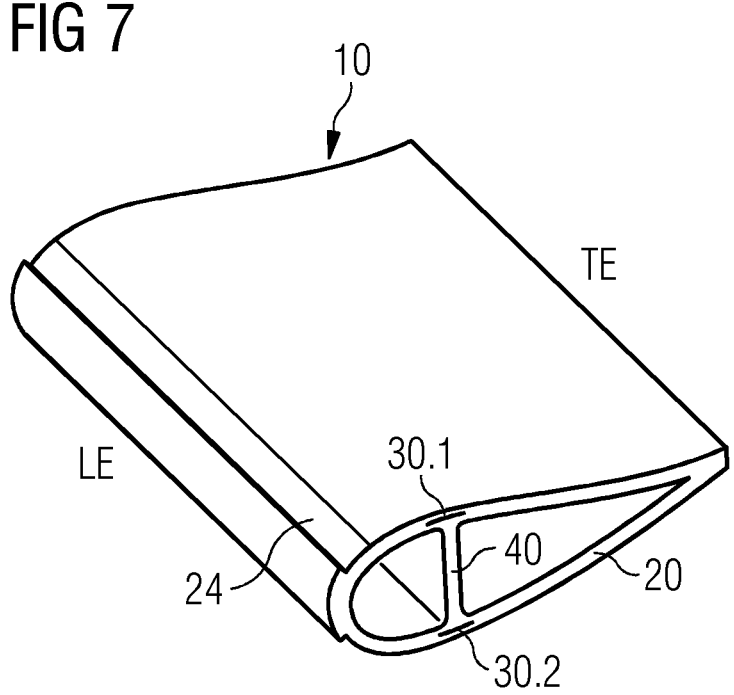

Some of the embodiments will be described in detail, with references to the following Figures, wherein like designations denote like members, wherein:

FIG. 1 a side perspective view on a wind turbine according to an embodiment of the invention;

FIG. 2 a cross section view of a leading edge portion of a wind turbine blade according to the state of the art;

FIG. 3 a view on a detail of the wind turbine blade of FIG. 1;

FIG. 4 a cross section view of a leading edge portion of a wind turbine blade according to an embodiment of the invention;

FIG. 5 a view on a detail of the wind turbine blade of FIG. 4;

FIG. 6 a side perspective view on a mold for performing the method of manufacturing the wind turbine blade of FIGS. 4 and 5 according to an embodiment of the invention; and FIG. 7 a side perspective view on a part of the wind turbine blade as manufactured according to the method from FIG. 6.

DETAILED DESCRIPTION

FIG. 1 shows a wind turbine 1 according to an embodiment of the invention. The wind turbine 1 comprises a rotor 4 having three wind turbine blades 10.1, 10.2, 10.3 connected to a hub 5. However, the number of wind turbine blades 10 may be at least one wind turbine blade 10, two wind turbine blades 10 or more than three wind turbine blades 10 and chosen as required for a certain setup of a wind turbine 1. The hub 5 is connected to a generator (not shown) arranged inside a nacelle 6. During operation of the wind turbine 1, the blades 10 are driven by wind to rotate and the wind's kinetic energy is converted into electrical energy by the generator in the nacelle 6. The nacelle 6 is arranged at the upper end of a tower 7 of the wind turbine 1. The tower 7 is erected on a foundation 8 such as a monopile or tripile. The foundation 8 is connected to and/or driven into the ground or seabed.

FIG. 2 shows a cross section view of a portion of a leading edge LE of a wind turbine blade 10 according to the state of the art. A shell 20 of the wind turbine blade 10 is provided with a paint coating 23 on top of it. A protective cover 50 is attached to the shell 20 on top of the paint coating 23 by an adhesive.

FIG. 3 shows a view on a detail III of the wind turbine blade 10 of FIG. 1. From FIG. 3 it can be taken that the shell 20 is made from a preform having a core material 21 and layers of laminate 22.1 attached to the top surface of the core material 21 and layers of laminate 22.2 attached to the bottom surface of the core material 21. A transition 25 or transition zone from the protective cover 50 to the paint coating 23 is not flush but comprises a step. The air flow at the location of the transition 25 comprising the step is turbulent, which may lead to a loss of blade efficiency and thereby reduction of annual energy production of a wind turbine 1 provided with such a wind turbine blade 10.

FIG. 4 shows a cross section view of a portion of a leading edge LE of a wind turbine blade 10 according to an embodiment of the invention. Here, the protective cover 50 has been casted together with the preform of the shell 20. Thus, the protective cover 50 is not attached to the paint coating 23 but instead directly to the preform or the layers of laminate 22.

FIG. 5 shows a view on a detail V of the wind turbine blade 10 of FIG. 4. As can be taken from this view, there is a flush transition 25 from the protective cover 50 towards the paint coating 23 compared to the transition 25 as known from the state of the art according to FIGS. 2 and 3, whereby the blade efficiency is kept at a high level.

FIG. 6 shows a side perspective view on a mold 60 for performing the method of manufacturing the wind turbine blade 10 of FIGS. 4 and 5 according to an embodiment of the invention.

The mold 60 comprises an insert 61 or in other words a protrusion. The insert 61 runs along a length of the shell 20 to be manufactured on the mold 60. When the preform is build up on the mold 60 by the worker 70, a recess 24 as shown in FIG. 7 and corresponding to the insert 61 is provided in the shell 20 of the wind turbine blade 10.

The mold 60 as shown may be used for manufacturing of a wind turbine blade 10 having a shell 20 of a butterfly configuration, in which two halves of the shell 20 are joined at the trailing edge TE and the leading edge LE. However, there may be a further mold 60 having the insert 61 such that an integral shell 20 of a wind turbine blade 10 may be manufactured having a further recess 24 at its leading edge LE. Thereby, embodiments of the invention may be provided independently from the particular configuration or type of the shell 20.

FIG. 7 shows a side perspective view on a part of the wind turbine blade 10 as manufactured according to the method from FIG. 6. The wind turbine blade 10 has the shell 20 and spar caps 30.1, 30.2 inside of the shell 20 connected to each other by a spar web 40. At its leading edge LE, the shell 24 is provided with the recess 24. In the recess 24, the protective cover 50 may be arranged or interlocked with the recess 24, such that a form-fitting is achieved and a flush transition 25 from the protective cover 50 to a paint coating 23 on the shell 20 may be achieved. The paint coating 23 may be provided before or after arranging the protective cover 50 in the recess 24. In this particular embodiment of the invention, the recess 24 is wedge-shaped, in particular such that it is tapered from the leading edge LE towards the trailing edge TE.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for manufacturing a shell of a wind turbine blade having improved leading edge erosion protection, wherein the method comprises the steps of:
    (a) providing a preform of the shell,
    (b) providing a protective cover for protection of the shell,
    (c) arranging the protective cover at a portion of a leading edge of the shell, so that an erosion protected shell is obtained; and
    (d) casting the erosion protected shell together with the protective cover, wherein casting includes pouring or injecting a liquid material into a mold on which the preform of the shell is provided, so that the shell of the wind turbine blade having the improved erosion protection is obtained; wherein a paint coating is applied on portions of the shell being adjacent to the protective cover such that a flush transition from the paint coating to the protective cover is obtained and wherein the paint coating is not applied on portions of the shell where the protective cover is attached to the shell.

2. The method according to claim 1, wherein the preform comprises a core material and layers of laminate.

3. The method according to claim 2, wherein the protective cover comprises or consists of a material different from the core material and the layers of laminate.

4. The method according to claim 2, wherein the protective cover comprises or consists of a material being relatively softer than the preform.

5. The method according to claim 1, wherein the protective cover comprises or consists of at least one of a silicone and a rubber.

6. The method according to claim 5, wherein the protective cover comprises or is from polyurethane.

7. The method according to claim 1, wherein the protective cover is a precasted protective cover.

8. The method according to claim 1, wherein the protective cover is arranged in a recess of the preform of the shell.

9. The method according to claim 8, wherein the preform of the shell is provided on the mold, wherein the mold comprises an insert for providing the recess in the preform of the shell.

10. The method according to claim 1, wherein the casting is performed by vacuum assisted resin transfer molding.

11. The method for manufacturing a wind turbine blade comprising a method according to claim 1, wherein a spar cap and a spar web are attached to the shell.

12. A shell for a wind turbine blade, wherein the shell has improved leading edge erosion protection and comprises a core material and layers of laminate, wherein a protective cover for protection of the shell is arranged at portion of a leading edge of the shell and is provided as being casted together with the core material and the layers of laminate, wherein a paint coating is applied on portions of the shell being adjacent to the protective cover such that a flush transition from the paint coating to the protective cover is obtained, and wherein the paint coating is not applied on portions of the shell where the protective cover is attached to the shell.

13. A wind turbine blade comprising a shell according to claim 12, wherein a spar cap and a spar web are attached to the shell.

14. A wind turbine comprising at least one wind turbine blade according to claim 13.

* * * * *